No. 823,757. PATENTED JUNE 19, 1906.
C. L. BETZ.
BATCH DRYING, HEATING, AND FEEDING APPARATUS FOR GLASS FURNACES.
APPLICATION FILED MAY 3, 1905.
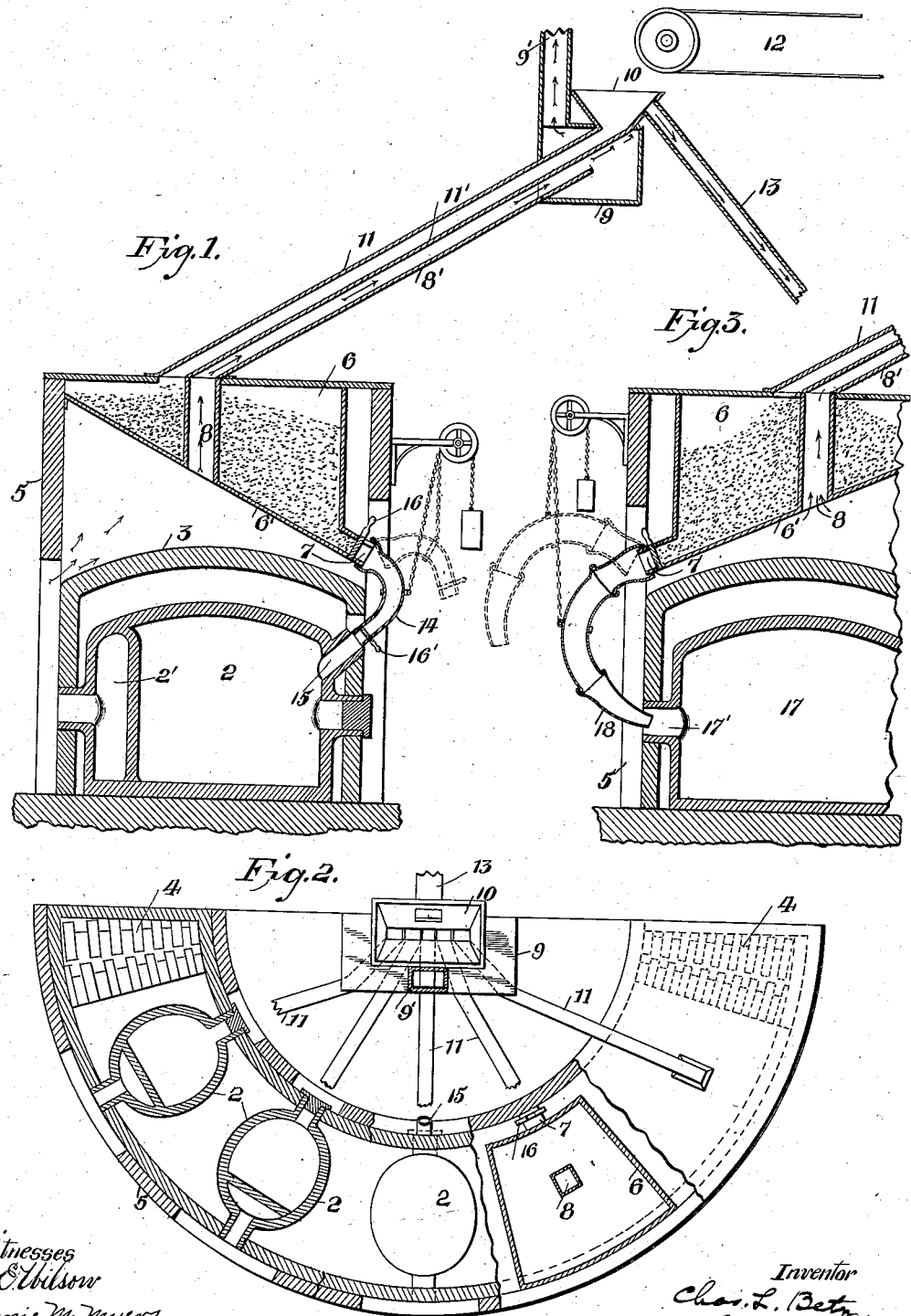

UNITED STATES PATENT OFFICE.

CHARLES L. BETZ, OF ROCHESTER, PENNSYLVANIA, ASSIGNOR TO HENRY C. FRY, OF ROCHESTER, PENNSYLVANIA.

BATCH DRYING, HEATING, AND FEEDING APPARATUS FOR GLASS-FURNACES.

No. 823,757.                    Specification of Letters Patent.         Patented June 19, 1906.

Application filed May 3, 1905. Serial No. 258,720.

*To all whom it may concern:*

Be it known that I, CHARLES L. BETZ, a citizen of the United States, residing at Rochester, in the county of Beaver and State of Pennsylvania, have invented certain new and useful Improvements in Batch Drying, Heating, and Feeding Apparatus for Glass-Furnaces, of which the following is a specification, reference being had therein to the accompanying drawings.

This invention relates to glass-melting apparatus, and has particular reference to means for drying the batch and for heating the same in a preliminary way before it enters the furnace. The invention further relates to the utilization of the heat radiated from the furnace for drying and heating the batch. The invention has further reference to improved mechanism for feeding the batch to the furnaces.

In the manufacture of glass it is a well-known fact that the batch contains a considerable amount of moisture as it comes from the mixing-room, and when the moist batch is placed in the furnace and heated the steam or vapor generated therefrom injuriously affects the furnace, particularly pot-furnaces, the greatest loss resulting in the pots cracking from this cause. Furthermore, with the batch moist and cold an appreciably longer time is required in melting the same than when the batch is first thoroughly dried and heated. With the present invention the objections referred to are avoided, the furnaces are preserved, and the melting operation is facilitated.

In the accompanying drawings, Figure 1 is a vertical sectional view of apparatus embodying my invention. Fig. 2 is a top plan view of the same, partly in section. Fig. 3 illustrates a modification.

While the invention may be utilized in connection with various types of pot and tank furnaces, I have here shown the same as applied to a series of continuous pot-furnaces 2, which are arranged within a furnace-chamber 3, the curved or semicircular form of the latter here shown being a convenient and compact shape for most glass-factories. The furnace may be variously fired or heated, such feature of the apparatus comprising no portion of the invention. As here shown, each end of the floor of furnace 3 has a checker-work 4, whereby the heat generated from below may be directed through the furnace and around the pots alternately in reverse directions, as in the well-known types of reverberatory furnaces.

Above and inclosing furnace-chamber 3 is a superstructure 5, within which is a series of bins or hoppers 6, in the present adaptation of the invention one of these bins being arranged above each of pot-furnaces 2. The bottom 6' of each bin is inclined, and at the lower end thereof is the discharge-passage 7 of neck form, through which the batch is passed to the furnace in manner presently to be described. The bins are above the crown of furnace-compartment 3 and are so separated from each other that the heat has access to all sides thereof, whereby the batch contained therein is thoroughly dried and heated preliminarily before passing to the melting-furnaces. Furthermore, the heated air from inclosure 5 is conducted through flues 8, one of which extends upward through each of bins 6 and from thence in inclined direction, as indicated at 8', to a flue-box 9, from which all of the several flues radiate, said box being provided with a chimney connection 9'.

Located above or adjacent to box 9 is a batch-receiving hopper 10, from which radiate the several bin-filling chutes 11, which preferably extend through box 9 and downward over inclined flues 8' with their lower ends opening into bins 6. As chutes 11 and flues 8' are separated only by a thin metal partition 11', the latter constitutes a heated surface, over the entire length of which the batch travels by gravity from hopper 10 to the bins, so that even before the batch reaches the bin it is heated and much of the moisture removed. The batch may be conveyed from the mixing-room (not shown) to hopper 10 by an endless conveyer 12, of any desired form, while an overflow-chute 13 may extend from the hopper back to the mixing-room for the purpose of returning any excess material from the hopper. It will of course be understood that in practice any desired number of melting-furnaces may be utilized in a single apparatus, or one alone may be used, the number of flues 8' and chutes 11 being varied accordingly. Where there are a number of furnaces and it is not desired to utilize all of them, the filling-chutes of those not in use may be plugged at hopper 10, as will be understood. With flues 8 opening upwardly through bins 6 the hot air from inclosures 5 is conducted directly through the masses of batch within the several bins and at the same time is brought in direct contact with the surfaces over which the batch passes in flowing to the bins, thereby utilizing the waste heat in a most efficient way for thoroughly drying and heating the batch.

A convenient form of mechanism for filling pot-furnaces of continuous type, such as shown in Figs. 1 and 2, consists of a curved spout 14, hinged at its upper end to swing outward when not in use and when in use adapted to form a continuation of discharge-neck 7 of bin 6, with the lower end of the spout communicating with the filling-opening 15 of pot-furnace 2. Cut-offs 16 and 16' are arranged in the upper and lower portions of the filling-passage, cut-off 16 being open until the space upward from cut-off 16' is filled, when cut-off 16 is closed and cut-off 16' opened, thus permitting the measuring charge to flow into the furnaces. As many of these charges may be introduced at one time as desired, it being understood that with this type of pot-furnace the glass in working chamber 2' is continuously in condition for manufacture. When not in use, spout 14 is turned outward and upward, as indicated in dotted lines, and filling-opening 15 is plugged.

In those forms of apparatus employing the ordinary pot-furnaces 17, Fig. 3, the bottom of hopper 6 is preferably inclined toward the front and the hinged filling-spout 18 arranged to connect with the mouth of working hole 17', and as with this type of furnace the pot is filled to its fullest capacity for each heat and is then sealed up and the batch melted it is unnecessary to provide for measuring the amount entering the same.

While in the present embodiment of the invention the batch-receptacles are shown in elevated position in the furnace, whereby they are conveniently heated and whereby the batch will flow by gravity into the furnaces, the invention is not confined to such structure, as the receptacles may be variously located and the batch dried or dried and heated preliminarily by various means without departing from the spirit and scope of the invention as defined by the appended claims.

I claim—

1. The combination of a glass-melting furnace, a source of batch-supply above the furnace, a batch-conduit leading from the source of supply to the furnace, and a product or hot-air flue leading from the furnace and extending alongside of said conduit.

2. The combination of a furnace structure, a source of batch-supply above the furnace, a batch-heating receptacle within the furnace structure, a conduit extending from the source of supply to the receptacle, a product or hot-air flue leading from the furnace and extending alongside of said conduit, a glass-melting pot within the furnace, and means for passing the heated batch from said receptacle into the pot.

3. The combination of a glass-melting furnace, a source of batch-supply, a conduit leading from said source of supply to the furnace, and a product-flue extending from the furnace and located adjacent said conduit for the purpose of heating the same.

4. The combination of a glass-melting furnace, a source of batch-supply above the furnace, a batch-conduit leading from the source of batch-supply to the furnace, and a product-flue extending from the furnace and located adjacent the conduit for the purpose of heating the same.

5. The combination of a glass-melting furnace, a source of batch-supply above the furnace, a batch-conduit leading from the source of batch-supply to the furnace, and a product-flue leading from the furnace and paralleling said conduit and separated therefrom by a partition.

6. The combination of a glass-melting furnace, a source of batch-supply above the furnace, an inclined conduit extending from the source of batch-supply to the furnace, and a product-flue leading from the furnace and separated from the conduit by a partition, said partition forming the bottom of the conduit.

7. In glass-melting apparatus, the combination of a furnace structure, separate batch-heating and batch-melting receptacles within the structure, and a product-flue for the furnace structure extending through the batch-heating receptacle.

8. In glass-melting apparatus, the combination of a furnace structure, separate glass-heating and glass-melting receptacles therein, a source of batch-supply separate and apart from the furnace structure, a conduit leading from said source of supply to the batch-heating receptacle, and a product-flue for the furnace structure extending through the said heating-receptacle and leading from the furnace structure in close proximity to and heating the said conduit.

9. The combination of a glass-melting furnace, an elevated source of batch-supply, a conduit leading therefrom to the furnace, a product-chamber through which the upper portion of the conduit extends, and a product-flue leading from the furnace to said chamber.

10. The combination of a glass-furnace structure, a batch-receptacle in the upper portion of the structure and adapted to be heated by heat radiated from the furnace, and a hot-air outlet extending through the receptacle.

11. The combination of a series of glass-melting furnaces, a series of batch-receptacles—one for each furnace, means for heating the receptacles, a batch-receiving hopper, and chutes leading from the hopper to each of the receptacles.

12. The combination of a furnace structure, a series of glass-melting furnaces therein, a series of batch-receptacles in the upper portion of the structure, a batch-receiving hopper, and a series of chutes extending from the hopper to each of the melting-furnaces.

13. The combination of a furnace structure, a series of glass-melting furnaces therein, batch-receptacles within the upper portion of the structure and located one over each melting-furnace, hot-air flues extending through the receptacles, a chimney connection common to all of said flues, a batch-receiving hopper, and a series of chutes extending from the hopper alongside the said flues and opening into the said receptacles.

In testimony whereof I affix my signature in presence of two witnesses.

CHARLES L. BETZ.

Witnesses:
  FRANK B. CHENEY,
  J. M. SHUSTER.